United States Patent [19]
Ito et al.

[11] Patent Number: 5,486,036
[45] Date of Patent: Jan. 23, 1996

[54] SEAT-HEIGHT ADJUSTING DEVICE

[75] Inventors: Sadao Ito; Hiroshi Nawa, both of Aichi, Japan

[73] Assignee: Aisin Seiki Kabushiki Kaisha, Aichi, Japan

[21] Appl. No.: 123,089

[22] Filed: Sep. 17, 1993

[30] Foreign Application Priority Data

Sep. 18, 1992 [JP] Japan .................................. 4-249323

[51] Int. Cl.$^6$ ...................................................... A47C 1/02
[52] U.S. Cl. ............................................ 297/339; 297/338
[58] Field of Search ..................................... 297/339, 338, 297/344.12, 344.15, 344.17, 362; 248/394, 397, 421

[56] References Cited

U.S. PATENT DOCUMENTS

| | | |
|---|---|---|
| 4,143,912 | 3/1979 | Kramer. |
| 4,708,392 | 11/1987 | Werner et al.. |
| 5,120,109 | 6/1992 | Rangin ............................ 297/339 X |
| 5,203,532 | 4/1993 | Matsura ............................ 297/338 X |

FOREIGN PATENT DOCUMENTS 247135  10/1988  Japan ..................................... 297/338

*Primary Examiner*—Laurie K. Cranmer
*Attorney, Agent, or Firm*—Finnegan, Henderson, Farabow, Garrett and Dunner

[57] ABSTRACT

A seat-height adjusting device wherein a seat-cushion is moved relative to a vehicle-floor side is comprised of a supporting shaft having a first true round portion, a tapered eccentric portion and a second true round portion and rotatably mounted at the vehicle-floor side so as to be movable along a lateral direction thereof, a first gear secured to the the vehicle-floor side, supporting the first true round portion of the supporting shaft and having an inner teeth portion, a second gear linked to the seat-cushion, supported on the second true round portion of the supporting shaft and having inner teeth portion whose teeth number is different from that of the inner teeth portion of the first gear, an intermediate gear mounted on the tapered eccentric portion of the supporting shaft, having an outer teeth portion engaged with the inner teeth portions of the first gear and the second gear and differed therefrom in teeth number, and a device for urging the supporting shaft in order to increase a relationship between the tapered eccentric portion of the supporting shaft and intermediate gear.

8 Claims, 4 Drawing Sheets

SEAT-HEIGHT ADJUSTING DEVICE

BACKGROUND OF THE INVENTION

1. Field of the Invention

The present invention relates to a seat-height adjusting device.

2. Description of the Prior Art

In Japanese Patent Laid-open Print No. 63(1988)-90452 published in Apr. 21, 1988 without examination, a conventional seat-height adjusting device is disclosed. The conventional seat-height adjusting device includes a first gear having an inner teeth portion and secured to a seat-cushion with, and a second gear having an outer teeth portion and pivoted to a vehicle-floor side. The outer teeth portion is in meshing engagement with the inner teeth portion and is less than the inner teeth portion in teeth number. A shaft is rotatably mounted to the vehicle-floor side, and has an eccentric portion for supporting the second gear. When the shaft is rotated, the outer teeth portion of the second gear is brought into cycloid movement along the inner teeth portion of the first gear, which results in the inclination of the second gear. Thus, the height of the seat-cushion is expected to be varied relative to the vehicle-floor side.

In the foregoing structure, whenever one rotation of the shaft is established, the second gear moves inwardly in the radial direction temporarily due to the direct engagement of the inner and outer teeth portions, and the cycloid movement of the outer teeth portion of the second gear is not smooth as a whole. Thus, this cause an unnatural movement of the seat-cushion, which leads to an occupant's discomfort. In addition, the backlash between the inner and outer teeth portions which serves for smooth engagement therebetween may sometimes becomes play or rattle. This also will bring the occupant's discomfort.

The former drawback can be overcome by avoiding the direct engagement of the inner and outer teeth portions which is suggested by Japanese Patent Publication No. 56(1981)-14890 corresponding to U.S. Pat. No. 4,143,912. That is to say, a seat-reclining device disclosed in this reference includes a shaft having two true round portions and an eccentric portion therebetween, a stationary gear having an inner teeth portion and mounted on one of the true round portion, a movable member having an inner teeth portion and mounted on the other of the true round portion, an intermediate gear mounted on the eccentric portion and having an outer teeth portion which is in meshing engagement with both of the inner teeth portions of the stationary and movable gears. The inner teeth portions and the outer teeth portion differ each other in teeth number. In this structure, the intermediate gear prevents the radial movement of the movable gear.

The latter drawback can be overcome by the suggestion of Japanese Patent Laid-open Print No. 62(57517) corresponding to U.S. Pat. No. 4,708,392. This reference shows that a tapered eccentric portion of the shaft will establish an easy adjustment of the engagement between inner and other teeth portions by moving the shaft in the axial direction.

However, concurrently overcoming both of the foregoing drawbacks can not be attained by the combination of the foregoing two concepts. The reason is that in Japanese Patent Publication No. 56(1981)-14890 corresponding to U.S. Pat. No. 4,143,912 the shaft does not move in the axial direction since the eccentric portion is held between the the movable and stationary gears.

SUMMARY OF THE INVENTION

It is, therefore, an object of the present invention to provide a seat-height adjusting device which overcomes concurrently the foregoing drawbacks.

It is another object of the present invention to provide a seat-height adjusting device in which the movement of a seat-cushion is felt to be natural.

In order to achieve these objects, there is provided a seat-height adjusting device wherein a seat-cushion is moved relative to a vehicle-floor is comprised of a supporting shaft having a first true round portion, a tapered eccentric portion and a second true round portion and rotatably mounted at the vehicle-floor so as to be movable along a lateral direction thereof, a first gear secured to the vehicle-floor, supporting the first true round portion of the supporting shaft and having an inner teeth portion, a second gear linked to the seat-cushion, supported on the second true round portion of the supporting shaft and having inner teeth portion whose teeth number is different from that of the inner teeth portion of the first gear, an intermediate gear mounted on the tapered eccentric portion of the supporting shaft, having an outer teeth portion engaged with the inner teeth portions of the first gear and the second gear and differing therefrom in teeth number, and a device for urging the supporting shaft in order to increase a relationship between the tapered eccentric portion of the supporting shaft and intermediate gear.

BRIEF DESCRIPTION OF THE DRAWINGS

Additional objects and advantages of the present invention will become more apparent from the following detailed description of preferred embodiments thereof when considered with reference to the attached drawings, in which.

DETAILED DESCRIPTION OF THE INVENTION

Figure 1:
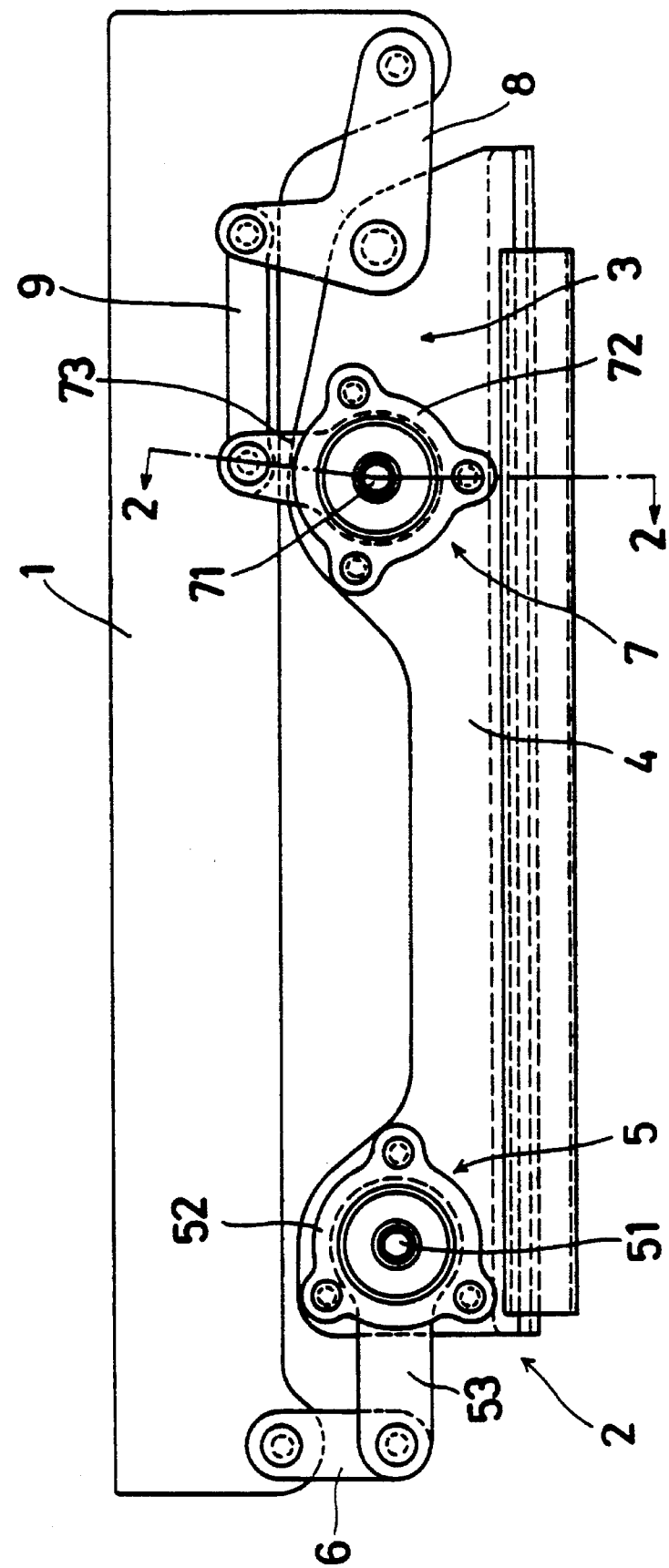
FIG. 1 is a side view of a seat-height adjusting device in accordance with the present invention.
Figure 2:
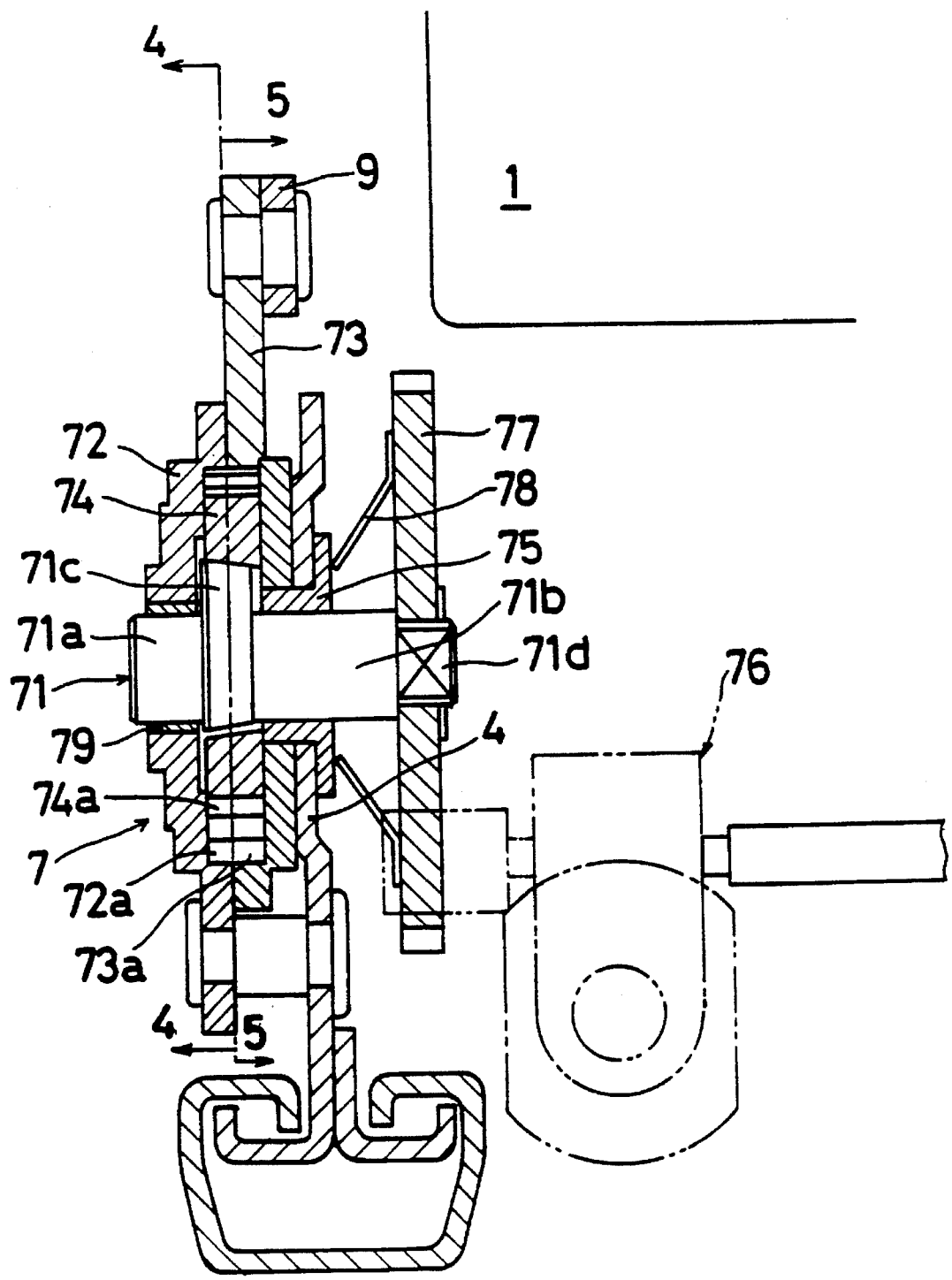
FIG. 2 is cross-sectional view taken along line A—A in FIG. 1.
Figure 3:
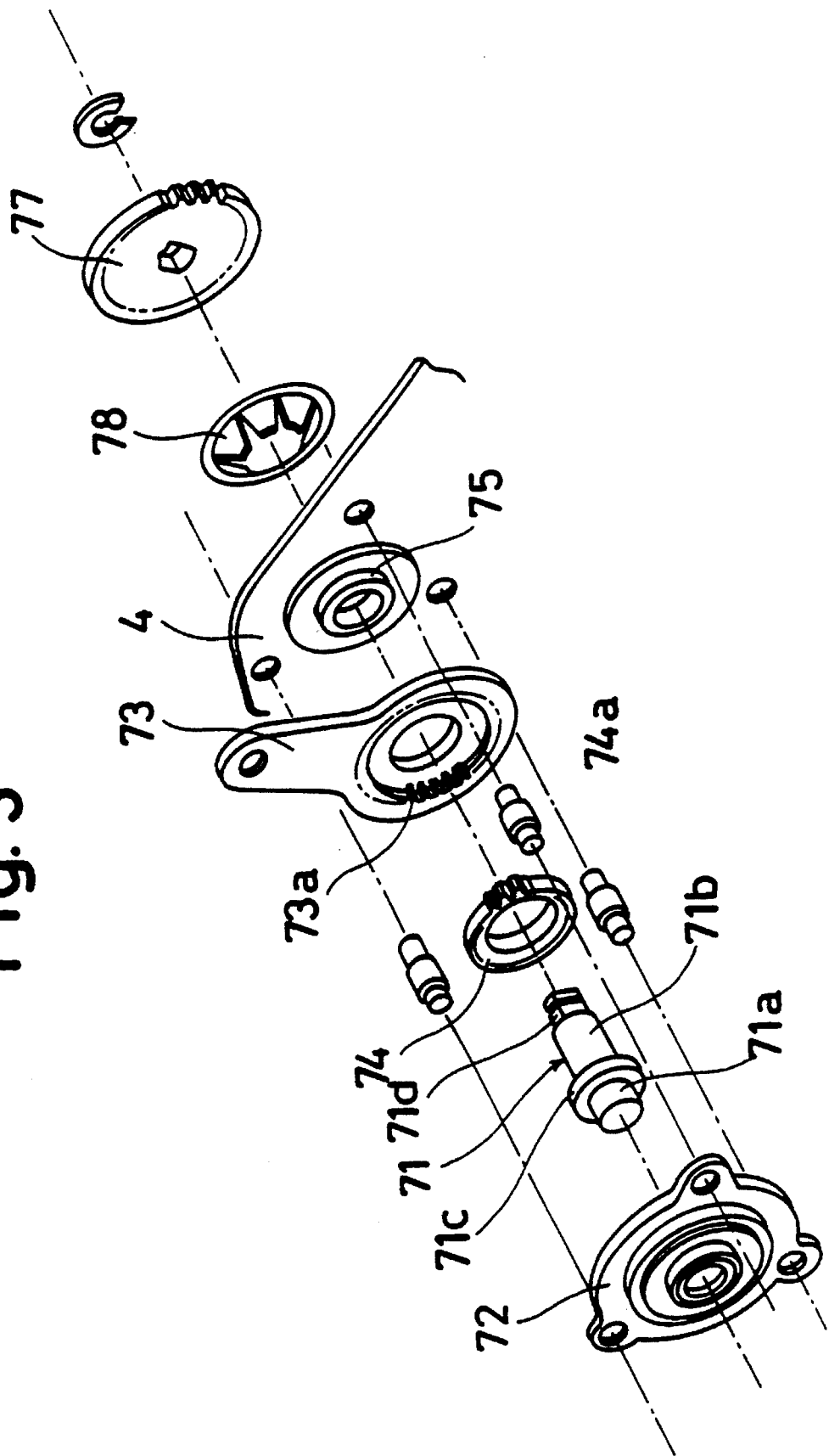
FIG. 3 is an exploded perspective view of the seat-height adjusting device shown in FIG. 1.
Figure 4:
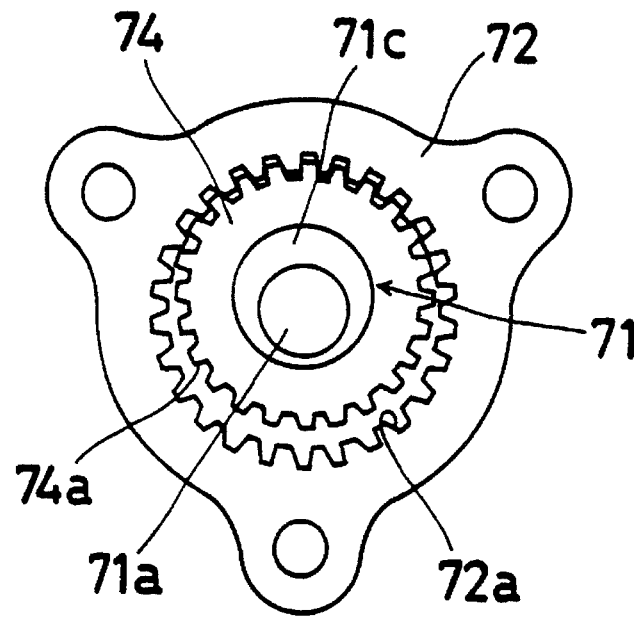
FIG. 4 is a cross-sectional view taken along line B—B in FIG. 2.
Figure 5:
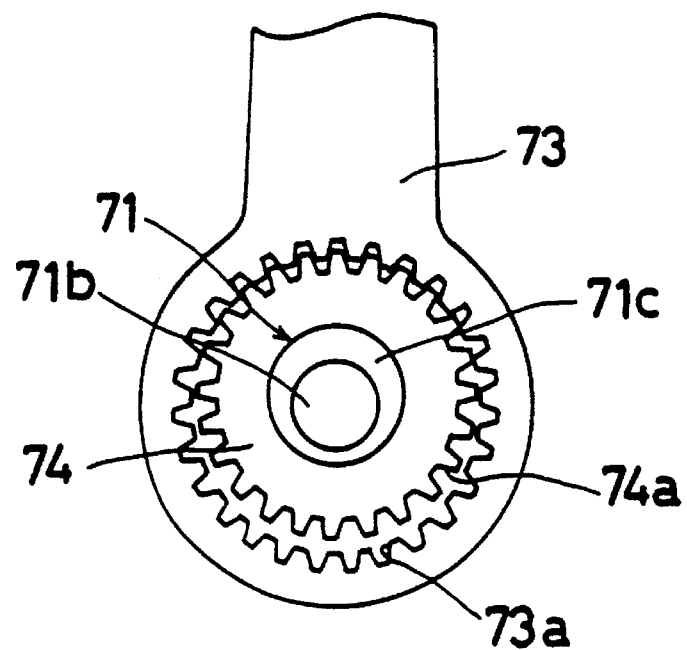
FIG. 5 is a cross-sectional view taken along line C—C in FIG. 2.

Referring first to FIG. 1, a seat cushion frame 1 is supported, via a front vertical mechanism 2 and a rear vertical mechanism 3, by a upper rail 4 as a portion of a sliding mechanism which is secured to a floor of a vehicle body (not shown). A front portion and a rear portion of the cushion frame 1 are intended to be moved in the vertical direction by the front vertical mechanism 2 and the rear vertical mechanism 3, respectively.

The front vertical mechanism 2 includes an operating portion 5 at a side of the upper rail and a link 6 which serves for a connection between an output side of the operating portion 5 and the front portion of the seat cushion frame 1. Similarly, the rear vertical mechanism 3 includes an operating portion 7 at a side of the upper rail 4, bell-crank 8 pivoted to the upper rail 4 and the rear portion of the seat cushion frame 1, and a link 9 which serves as a connection between an output side of the operating portion 7 and the bell-crank 8.

Hereinafter, the operating portion 7 will be explained in detail. It is to be noted that the operating portion 7 and the operating portion 5 are similar in construction and function by which an explanation of the latter is omitted.

As seen from FIGS. 2 through 5, the operating portion 7 includes a supporting shaft 71, a stationary gear 72, a movable gear 73, and an intermediate gear 74.

The supporting shaft 71 has a first true round portion 71a which is in the form of cylinder, a second true round portion 71b is co-axial with the first true round portion 71a formed in the form of a cylinder, an eccentric portion 71c disposed between the first true round portion 71a and the second true round portion 71b in such a manner that the axis of the eccentric portion is offset from the axis of the first true round portion 71a and the radius of the eccentric portion 71c becomes smaller gradually toward the second true round portion 71b, and a distal end portion 71d which is substantially oval in cross-section. The axis of the distal end portion 71d is co-axial with that of the second true round portion 71b. On the second true round portion 71b of the supporting shaft 71, there is mounted a bush 75 which is supported by the upper rail 4, in which the supporting shaft 71 is rotatable and is axially movable.

The stationary gear 72 is mounted via a bush 79 on the first true round portion 71a of the supporting shaft 71 and is secured to the upper rail 4. The stationary gear 72 has an inner teeth portion 72a which is obtained by an extrusion. The axis of the inner teeth portion 72a is in alignment with the axis of the first true round portion 71a.

The movable gear 73 is mounted on the second true round portion 71b of the supporting shaft 71 via the bush 75 and is connected to the other end 9 of the link 9. The movable gear 73 has an inner teeth portion 73a which is obtained by an extrusion. The inner teeth portion 73a is co-axial with the second true round portion 71b of the supporting shaft 71 and is different from the inner teeth portion 72a of the stationary gear 72 in teeth number.

The intermediate gear 74 is supported on the eccentric portion 71c of the supporting shaft 71 and has an outer teeth portion 74a which is in mashing engagement with the inner teeth portion 72a of the stationary gear 72 and the inner teeth portion 73a of the movable gear 73. The outer teeth portion 74a of the intermediate gear 74 is less, in teeth number, than each of the inner teeth portion 72a of the stationary gear 72 and the inner teeth portion 73a of the movable gear 73.

There is fixedly mounted a gear 77 on the distal end portion 71d of the supporting shaft 71. The gear 77 is intended to be driven by a driving mechanism 76 having a motor, a pinion gear and other elements. Around the supporting shaft 71, there is provided a dish-shaped spring 78 so as to be supported between the bush 75 and the gear 77. The urging force of the dish-shaped spring 78 is used for ensuring the support of the intermediate gear 74 by the eccentric portion 71c of the supporting shaft 21. It is to be noted this support should be in a condition where the meshing engagement strength between the stationary gear 72 and the movable gear 73 is not excessive in order to permit slight clearance or gap between the eccentric portion 71c and the intermediate gear 74.

An operation of the rear vertical mechanism 3 will be described hereinbelow. When the driving mechanism 76 is actuated, the resultant rotation is transmitted to the supporting shaft 71 via the gear 77. Then, as soon as the supporting shaft 71 is rotated, the intermediate gear 74 is brought into a cycloid movement remaining in engagement with the stationary gear 72 and the movable gear 73. Due to the difference in the number of teeth between the intermediate gear 74 and each of the stationary gear 72 and the movable gear 73, whenever the supporting shaft 71 makes one rotation of 360 degrees the movable gear 73 make an angular movement relative to the stationary gear 72 which corresponds to the difference in the number of teeth. Thus, due to continual rotations of the supporting shaft 71, the angular movement of the movable gear 73 is established, resulting in that a movement of the link 9. Thus, the bell-crank 8 is rotated through an angle, thereby elevating the rear portion of the cushion frame 1.

It is to ne noted that while the movable gear 73 is being rotated only the intermediate gear 74 causes the radial reciprocal movement and the movable gear 73 is free therefrom. This means that the movement of the seat-cushion can be established in smooth manner, whereby an occupant on the seat feels comfortable.

When the meshing strength between the inner teeth portion 72a (73a) of the stationary gear 72 (the movable gear 73) and the outer teeth portion 74a of the intermediate portion 74 becomes large, the resultant surplus force is applied to the eccentric portion 71c of the supporting shaft 71 which is formed into the tapered structure. Then, the supporting shaft 71 is moved in the leftward direction against the biasing force of the spring 78 by which the supporting shaft 71 is biased in the rightward direction. The leftward movement of the supporting shaft 71 looses the supporting force at a degree between the intermediate gear 74 and the eccentric portion 71c of the supporting shaft 71, which permits a radial movement of the gear 74. That is to say, the length of action between the inner teeth portion 72a of the stationary gear 72 (the inner teeth portion 73a of the movable movable gear 73) and the outer teeth portion 74a of the intermediate portion 74 is expected to be adjusted for maintaining a suitable engagement therebetween. This adjustment can be established only by the intermediate gear 74. The movable gear 73 is not concerned with this adjustment. This means that a smooth vertical movement of the seat-cushion can be established. In addition, this adjustment enables a backlash to reduce as small as possible between the inner teeth portion 72a (73a) of the stationary gear 72 (the movable gear 73) and the outer teeth portion 74a of the intermediate portion 74. This means that an elimination of the seat-cushion can be established. Moreover, even though a load is applied to the movable gear 73, the resultant load is expected to be transmitted not to supporting shaft 71 but the lower arm 4 directly due to the fact that the movable gear 73 is mounted via the bush 75 on the lower arm 4. Thus, the rotation of the supporting shaft 71 is not affected.

An operation of the front vertical mechanism 5 is expected to be operated similar to that of the rear vertical mechanism 7.

The principles, preferred embodiments, and modes of operation of the present invention have been described in the foregoing description. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A seat height adjusting device disposed between a frame supporting a seat-cushion and an upper rail slidably supported by a lower rail for fixing to a vehicle-floor, the seat height adjusting device comprising:

a bush secured to the upper rail;

a supporting shaft having a first true round portion, a tapered eccentric portion and a second true round portion, the second true round portion being rotatably mounted in the bush, the bush and the rotatably mounted supporting shaft being movable in a lateral direction along the vehicle floor:

a first gear secured to the upper rail rotatably supporting the supporting shaft at the first true round portion and having an inner teeth portion;

a second gear linked to the frame and supported on the bush, and having an inner teeth portion having teeth differing in number from that of the inner teeth portion of the first gear;

an intermediate gear mounted on the tapered eccentric portion of the supporting shaft, having an outer teeth portion in engagement with the inner teeth portions of the first gear and the second gear and having a different number of teeth than each of the inner teeth portions of the first and second gears; and means for urging the supporting shaft axially in order to tighten connection between the tapered eccentric portion of the supporting shaft and the intermediate gear.

2. A seat-height adjusting device in accordance with claim 1, wherein the urging means includes a first member secured to a distal end of the supporting shaft, and a spring disposed between the first member and the bush.

3. A seat-height adjusting device in accordance with claim 2, wherein the spring is in the form of a dish-shaped spring.

4. A seat-height adjusting device in accordance with claim 2, wherein the first member is rotatable with the supporting shaft.

5. A seat-height adjusting device in accordance with claim 1, wherein the radius of the tapered portion becomes smaller toward the second true round portion.

6. A seat height adjusting device disposed between a frame supporting a seat-cushion and an upper rail slidably supported by a lower rail for fixing to a vehicle-floor, the seat height adjusting device comprising:

a bush secured to the upper rail;

a supporting shaft having a first true round portion, a tapered eccentric portion and a second true round portion, the second true round portion being rotatably mounted in the bush, the bush and the rotatably mounted supporting shaft being movable in a lateral direction along the vehicle floor:

a first gear secured to the upper rail rotatably supporting the supporting shaft at the first true round portion and having an inner teeth portion;

a second gear linked to a front portion of the frame and supported by the bush, and having an inner teeth portion having teeth differing in number from that of the inner teeth portion of the first gear;

an intermediate gear mounted on the tapered eccentric portion of the supporting shaft, having an outer teeth portion in engagement with the inner teeth portions of the first gear and the second gear and having a different number of teeth than each of the inner teeth portions of the first and second gears; and means for urging the supporting shaft in order to tighten connection between the tapered eccentric portion of the supporting shaft and the intermediate gear.

7. A seat height adjusting device disposed between a frame supporting a seat-cushion and an upper rail slidably supported by a lower rail for fixing to a vehicle-floor, the seat height adjusting device comprising:

a bush secured to the upper rail;

a supporting shaft having a first true portion, a tapered eccentric portion and a second true round portion, the second true round portion being rotatably mounted in the bush, the bush and the rotatably mounted supporting shaft being movable in a lateral direction along the vehicle floor:

a first gear secured to the upper rail rotatably supporting the supporting shaft at the first true round portion and having an inner teeth portion;

a second gear linked to a rear portion of the frame and supported by the bush, and having an inner teeth portion having teeth differing in number from that of the inner teeth portion of the first gear;

an intermediate gear mounted on the tapered eccentric portion of the supporting shaft, having an outer teeth portion in engagement with the inner teeth portions of the first gear and the second gear and having a different number of teeth than each of the inner teeth portions of the first and second gears; and means for urging the supporting shaft axially in order to tighten connection between the tapered eccentric portion of the supporting shaft and the intermediate gear.

8. A seat height adjusting device to be disposed between a frame supporting a seat-cushion and an upper rail slidably supported by a lower rail which is to be fixed to a vehicle-floor, the seat height adjusting device comprising:

a front vertical mechanism for moving a front portion of the frame relative to a front portion of the upper rail; and a rear vertical mechanism for moving rear portion of the frame relative to a rear portion of the upper rail;

each of the front vertical mechanism and the rear vertical mechanism including a bush secured to the upper rail, a supporting shaft having a first true round portion, a tapered eccentric portion and a second true round portion and rotatably mounted in the bush so as to be movable along a lateral direction of the vehicle floor, a first gear secured to the upper rail side, supported on the first true round portion of the supporting shaft and having inner teeth portion, a second gear linked to the frame, supported on the bush and having inner teeth portion having teeth differing in number from that of the inner teeth portion of the first gear, an intermediate gear mounted on the tapered eccentric portion of the supporting shaft, having an outer teeth portion in engagement with the inner teeth portions of the first gear and the second gear and having a different number of teeth than each of the inner teeth portions of the first and second gears; and and means for urging the supporting shaft axially in order to tighten connection between the tapered eccentric portion of the supporting shaft and the intermediate gear.

* * * * *

UNITED STATES PATENT AND TRADEMARK OFFICE
CERTIFICATE OF CORRECTION

PATENT NO. : 5,486,036

DATED : January 23, 1996

INVENTOR(S) : ITO et al.

It is certified that error appears in the above-indentified patent and that said Letters Patent is hereby corrected as shown below:

Claim 7, column 6, line 9, after "true" insert --round--.

Claim 8, column 6, line 40, after "moving" insert --a--.

Signed and Sealed this

Eighteenth Day of February, 1997

Attest:

BRUCE LEHMAN

Attesting Officer        Commissioner of Patents and Trademarks